W. E. Arnold,
Horse Power.
Nº 1,135.  Patented Apr. 26, 1839.
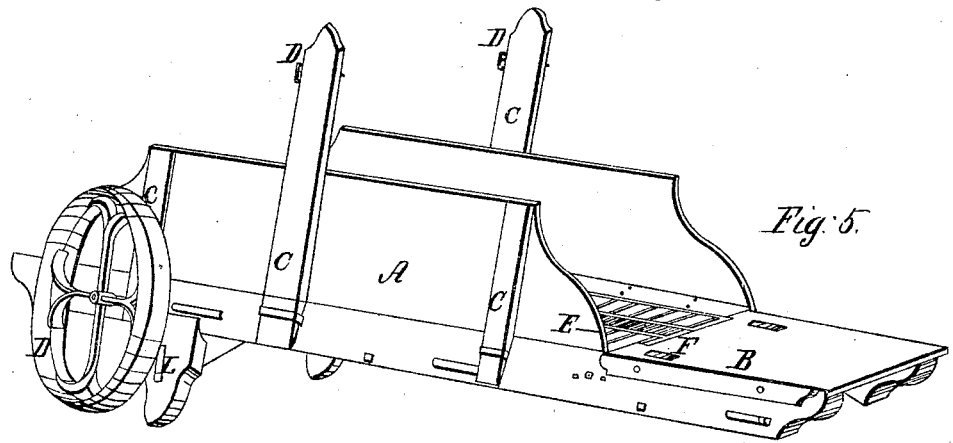
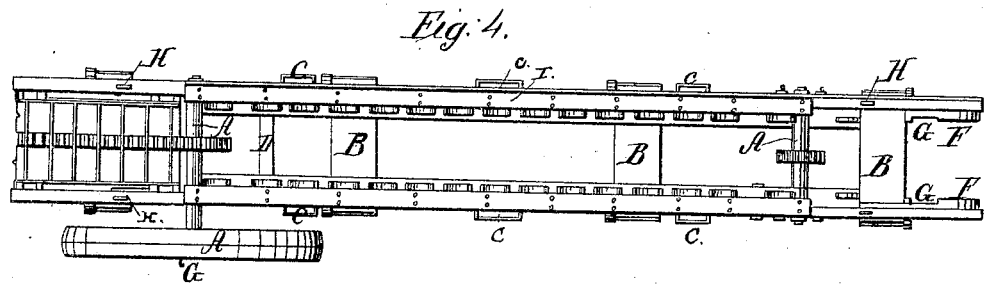
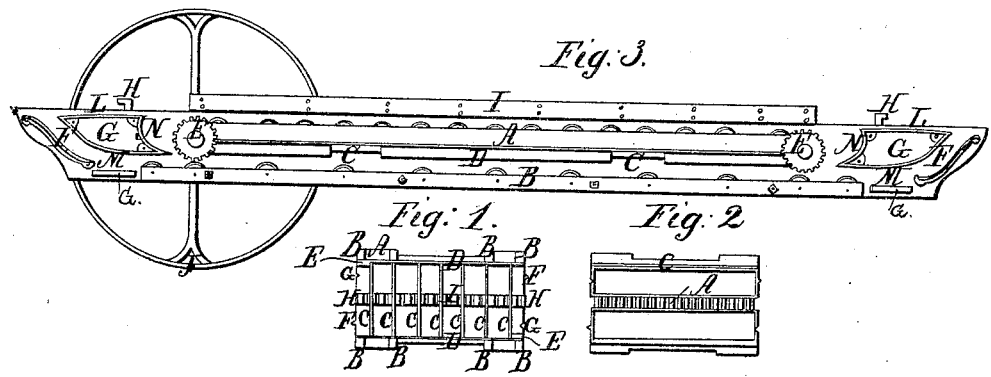
Witnesses;
A. Reynolds
M. Miller
Inventor;
Wm E. Arnold

UNITED STATES PATENT OFFICE.

WM. E. ARNOLD, OF ROCHESTER, NEW YORK.

HORSE-POWER FOR DRIVING MACHINERY.

Specification of Letters Patent No. 1,135, dated April 26, 1839.

*To all whom it may concern:*

Be it known that I, WILLIAM E. ARNOLD, of the city of Rochester, in the county of Monroe and State of New York, late of Chatham, in the county of Middlesex and State of Connecticut, have invented a new and useful Improvement in Machines for the Application of Horse or other Animal Power to Sundry Mechanical Purposes, which improved machine is described as follows, reference being had to the annexed drawing of the same, making a part of this specification.

This machine, as shown in the drawing, is adapted to ten cast iron treads, each two feet long, fourteen inches wide and a quarter of an inch thick, and made as represented by Figures 1 and 2.

Fig. 1 shows the upper side of the tread. It is reduced in width in the center to one foot, so as to leave a wing on flange A, on each side, at each end, six inches long—the ends of the flanges B, being raised to three eighths of an inch in thickness. The cross lines C, represent raised pieces five sixteenths of an inch square, to prevent the horse from slipping. The lines D, lengthwise on the sides represent elevations in the tread of three eighths of an inch, except at one end of each, diagonally, where it rises to a point E, one inch high, for the purpose hereinafter mentioned. The point F, and opening G, at each end are to prevent the tread from slipping sidewise. Letter H represents open gear or rounds, five eighths of an inch deep, and half an inch thick—the upper side being on a level with the under side of the web of the tread.

Fig. 2, represents the under side of the same tread. Letter A, shows the rounds or gear, the same as described by letter B, in Fig. 1. C represents bearings seven eighths of an inch wide and one eighth of an inch thick, to run upon the friction rollers hereafter described. The stay pieces on the ends of the treads are the same in depth as the gear where they connect with it, and gradually diminish to the thickness of the bearings where they connect with them.

Fig. 3 gives an inside view of one of the side planks, which are two inches thick, together with the running gear and fixtures. The depth of the machine is governed by the size of the gear wheel E. The size of those represented in these drawings are six inches in diameter. The friction rollers in timber A, are three inches and a half in diameter, those in timber B, three inches—all of which run upon stationary cast steel pins or bearings three eighths of an inch in diameter. These timbers are attached to the side plank and the rollers are removed to a sufficient distance therefrom to accommodate the bearings on the tread. Letter T, represents a covering over the flanges of the treads when in place, which consists of a piece of timber two inches thick, and three inches wide, secured upon the side plank, and beveled off from within three fourths of an inch of the outer side, to the inside, and covered with plate iron. D represents the covering over the flanges of the treads as they run upon the lower rollers, and consist of pieces of timber one inch square, secured to the side plank. C represents mortises, for the tenants of the cross pieces or girts designated by letter B, in Fig. 4. F, and G, in Fig. 3 represent stationary cast iron guides to regulate the rising and falling of the treads at the ends. Guide F is eleven inches long; one inch and a half thick, projecting from the side plank, and one inch wide, increased however, at each end to give place for screws to fasten it to the side plank; the upper end is placed one inch below the top of the side plank, and the upper side of the lower end on a line parallel with the upper side or line of the lower rollers. Guide G, is also one inch thick, projecting from the side plank; and one inch wide—the upper horizontal part letter L, is placed on a line parallel with the lower side of the flanges as they run upon the upper rollers, and is eleven and a half inches in length—the length of the under part M, from the extreme points, is one foot and three inches—and that of the ellipsis N, five and a half inches; the depth from L to M, five inches. The operation of the treads when passing the ends is as follows—the outer end of the tread is supported and governed, when rising or falling, by guide F, and the inner end is kept in gear by the ellipsis of guide G, and in order that the inner flange may be carried over and caught upon the lower or inner point of guide G, the outer end of the tread is run about half way up guide F, before the other end leaves the roller directly under the gear wheel, then the inner end of the inner flange will be carried over the lower point of the ellipsis of guide G, and the whole tread be raised up to its upper horizontal position, and immediately forced onward in its course by the gear wheel. Letters H, are hooks to secure the decks as shown by letter B, in Fig. 5. Letter T, is the band wheel, three feet in diameter, from which the power is communicated.

Fig. 4, represents a top or horizontal view of the machine with the decks, and sides to inclose the horse and all the treads, except one removed, which one tread is there shown as either rising or falling. Letters A, are wrought iron shafts on which the pinion or gear wheels are fastened. B are cross pieces which connect the side plank. D is a girt or cross piece to the legs as shown in Fig. 5. C, are iron staples of suitable size to receive and hold the posts and sides which inclose the horse. The boxes in the side plank of the short shaft are movable lengthwise of the machine in order to tighten or loosen the flooring. All other parts shown in this figure have been already described. The treads are put into the machine one after another at the end as shown in Fig. 4, and when all in, the deck B, as shown in Fig. 5, is put on and secured by hooks H, which deck is made to cover the entire tread as it rises and falls. L represents legs sufficiently long to give a suitable inclination to the machine.

Fig. 5, represents the machine ready for operation, with the exception of the forward deck, which is made in the same manner, and for the same purpose as deck B. These decks are made with stiffening pieces attached to the sides, falling down a little over the side planks, and secured in their places by hooks H. These decks are designed to cover the entire head at the ends of the machine, on the top, and particularly to form with timber T, in Fig. 3 a continuous covering for the flanges. The under sides of these decks over the flanges of the treads are plated with thin iron to prevent wear; and the outer ends of these irons are bent half an inch below the decks, in order to keep the outer flanges of the treads in their places upon the top of the guides. Another small piece of iron is put on the under sides of the decks to meet the rising points shown by letters E, on the ends of the lines D, in Fig. 1, the object being to keep the treads in gear when passing down until the inner flanges enter the ellipsis of guide G, and prevent wear.

The forward end of the machine sets upon movable keys L, which are moved forward or backward to make a greater or less inclination as may be desired. A and C, in this figure are movable sides and posts to inclose the horse and keep him to his work.

In order to put this machcine in operation the horse is introduced from the lower end on to the top of the flooring between the posts and sides C and A, and secured by his harness to a hook and point D. It will now be readily seen that a continuous flooring for the horse, and a continuous motion of the machine, are thus maintained, although the several treads are wholly disconnected, and, in all their movements, are continued the same side up.

The machine as shown in the drawing is intended for only ten treads; but the number may be increased or diminished, and, the machine itself, increased in length or width, or both, to meet any increased demand of power and its different parts may be varied in any way consistently with the principles and mode of operation herein set forth and described.

The advantages which this machine has over all others now in use are many and great, among which are its greater durability, compactness of form, simplicity of construction, and the much lower price at which it can be afforded.

Having thus set forth the construction of my improved machine and explained the manner of its operation, I do hereby declare that I do not claim as new the principle of causing the treads to rise and fall at the end of the machine, without turning or rolling, (this having been already secured to me by Letters Patent dated May 7th, 1831.). But What I do now claim as my invention and desire to secure by Letters Patent, is—

The principle of making cast iron treads, with one or more rows of open rounds or gearing running lengthwise through the same, and so constructed as to operate and be operated upon both on the upper and under side thereof by the pinion wheels at the ends, on the shafts before mentioned—and also of making cast iron treads, with wings or flanges on the sides adapted to stationary guides at the ends which regulate the rise and fall of the tread, without turning or rolling, when driven by the same pinion wheels, all as herein described.

Dated Jan. 1st, 1839.

WM. E. ARNOLD.

Witnesses:
   Chas. C. Young,
   I. A. Eastman.